US012723552B2

(12) United States Patent
Huber et al.

(10) Patent No.: US 12,723,552 B2
(45) Date of Patent: Sep. 1, 2026

(54) SYSTEM AND METHOD FOR OPERATING AN INTERNAL COMBUSTION ENGINE WITH PRESSURE MEASUREMENTS OR PRESSURE ESTIMATES BASED ON A PLAUSIBILITY CHECK

(71) Applicant: INNIO Jenbacher GmbH & Co OG, Jenbach (AT)

(72) Inventors: Johannes Huber, Kramsach (AT); Meric Andre, Vomp (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 46 days.

(21) Appl. No.: 18/651,687

(22) Filed: Apr. 30, 2024

(65) Prior Publication Data

US 2025/0035059 A1 Jan. 30, 2025

(30) Foreign Application Priority Data

Jul. 25, 2023 (DE) ......................... 102023119581.6

(51) Int. Cl.
*G01M 15/08* (2006.01)
*F02D 35/02* (2006.01)
*F02D 41/14* (2006.01)

(52) U.S. Cl.
CPC ....... *F02D 41/1498* (2013.01); *F02D 35/024* (2013.01); *F02D 35/027* (2013.01); (Continued)

(58) Field of Classification Search
CPC .. F02D 41/1498; F02D 35/024; F02D 35/027; F02D 2200/0406; F02D 2200/0414
See application file for complete search history.

(56) References Cited

U.S. PATENT DOCUMENTS 5,400,648 A 3/1995 Mahr
7,610,139 B2 * 10/2009 Mizuno ................ G01L 27/007
73/114.16

(Continued)

FOREIGN PATENT DOCUMENTS

DE 3505210 A1 8/1986
DE 10227279 A1 1/2004

(Continued)

OTHER PUBLICATIONS

German Office Action for DE Application No. 10 2023 119 581.6 dated Apr. 4, 2024; 8 pgs.

(Continued)

*Primary Examiner* — Gonzalo Laguarda
(74) *Attorney, Agent, or Firm* — Fletcher Yoder, P.C.

(57) ABSTRACT

A method for operating an internal combustion engine, including collecting a knocking signal of a knocking sensor and collecting a cylinder pressure signal of a cylinder pressure sensor. The cylinder pressure signal is representative of a cylinder pressure prevailing in at least one combustion chamber of the internal combustion engine. The method further includes determining an estimated cylinder pressure on the basis of a model and the knocking signal, and subjecting the cylinder pressure signal to a plausibility check. The method further includes, if the cylinder pressure signal is not plausible according to the plausibility check, using the estimated cylinder pressure for the operation of the internal combustion engine.

20 Claims, 1 Drawing Sheet

(52) U.S. Cl.
CPC ................ *F02D 2200/0406* (2013.01); *F02D 2200/0414* (2013.01); *F02D 2200/1002* (2013.01); *F02D 2200/1015* (2013.01)

(56) References Cited

U.S. PATENT DOCUMENTS

| | | | | |
|---|---|---|---|---|
| 8,910,615 | B2 * | 12/2014 | Suzuki | F02D 41/1486<br>701/111 |
| 2012/0150414 | A1 | 6/2012 | Huang | |
| 2018/0320622 | A1 | 11/2018 | Oohata | |

FOREIGN PATENT DOCUMENTS

| | | | | |
|---|---|---|---|---|
| DE | 112016004758 | T5 | 7/2018 | |
| WO | WO-2017039614 | A1 * | 3/2017 | F02D 35/027 |
| WO | 2017091130 | A1 | 6/2017 | |

OTHER PUBLICATIONS

Canadian Office Action for CA Application No. 3,237,099 dated Jun. 16, 2025; 4 pgs.
European Office Action for EP Application No. 24163402.1 dated Sep. 12, 2024; 8 pgs.

* cited by examiner

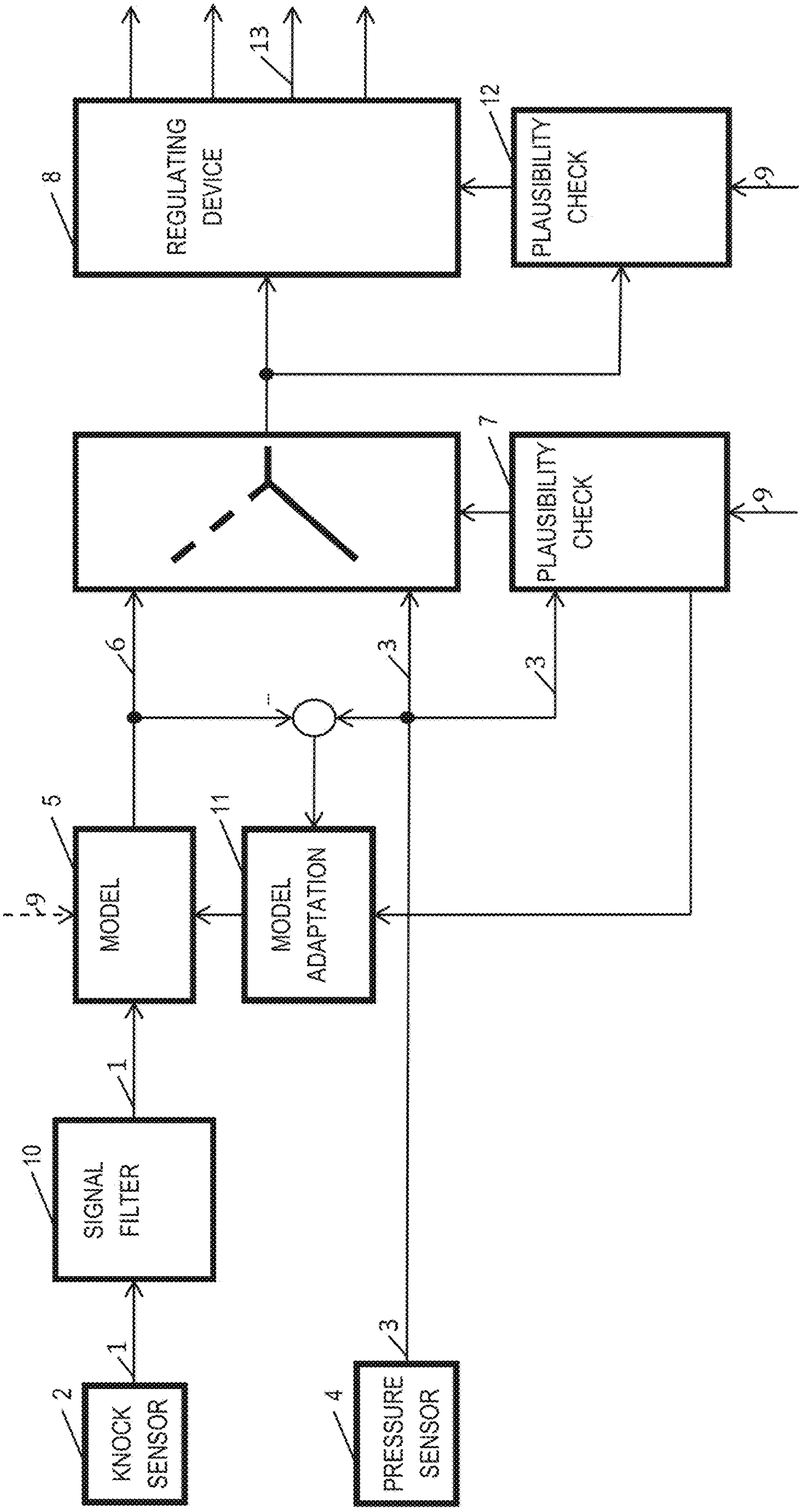
KNOCK SENSOR
2
1
SIGNAL FILTER
10
1
MODEL
5
9
MODEL ADAPTATION
11
PRESSURE SENSOR
4
3
6
3
3
PLAUSIBILITY CHECK
7
9
REGULATING DEVICE
8
PLAUSIBILITY CHECK
12
9
13

SYSTEM AND METHOD FOR OPERATING AN INTERNAL COMBUSTION ENGINE WITH PRESSURE MEASUREMENTS OR PRESSURE ESTIMATES BASED ON A PLAUSIBILITY CHECK

CROSS-REFERENCE TO RELATED APPLICATION

This application claims priority to and benefit of German Application No. DE102023119581.6, filed on Jul. 25, 2023, entitled "METHOD FOR OPERATING AN INTERNAL COMBUSTION ENGINE", which is herein incorporated by reference in its entirety.

BACKGROUND

The present invention relates to a method for operating an internal combustion engine, an internal combustion engine, and a computer program product and a computer-readable storage medium.

For operating an internal combustion engine, it is known from the state of the art to take parameters from the ongoing process of combustion in order to be able to obtain information about the currently existing combustion process.

Usually, the prevailing cylinder pressure of at least one combustion chamber of the internal combustion engine is used as such a parameter, wherein a large amount of information about the combustion process can be obtained via the pressure and the point in time of the prevailing pressure and, via this information, it is possible to intervene in the combustion process in order to prevent deviations and/or to optimize the combustion process.

It is known to take the cylinder pressure via cylinder pressure sensors, which protrude into the combustion chamber of the internal combustion engine and are formed to provide a characteristic signal for the cylinder pressure prevailing in the combustion chamber.

Corresponding sensors, which are commercially available, have a very broad range in terms of quality, durability and the quality of the sensor signal, wherein this range in quality is explained by the manufacturing effort and the material requirement and is reflected in the prices.

However, a disadvantage of cylinder pressure sensors is that they represent a certain weak point in the regulation chain of an internal combustion engine, since corresponding cylinder pressure sensors-irrespective of the quality or the price-exhibit damage after a particular number of operating hours and their representative sensor signal deteriorates. In the case of those of poorer quality (and usually more favourable in terms of price), such a deterioration usually occurs earlier on.

This change in the sensor signal is due to the fact that cylinder pressure sensors are exposed to the combustion process of the internal combustion engine, which leads to enormous thermal and mechanical loads, resulting in material fatigue and/or defects in the cylinder pressure sensor after a particular number of operating hours.

Furthermore, it is known from the state of the art to use knocking sensors, which measure the structure-borne noise of the internal combustion engine and supply a corresponding representative knocking signal, in internal combustion engines. These knocking sensors or their knocking signal are mostly used to monitor the combustion process as to whether backfiring or knocking of the internal combustion engine is occurring.

However, it is also known from the state of the art to determine the cylinder pressure via the knocking signal since, over the course of development in terms of their precision and accuracy, the knocking sensors have developed to the extent that conclusions can be drawn about individual operating parameters, such as for example the ignition in the combustion chamber, via the structure-borne noise and the vibration of the internal combustion engine and thus the cylinder pressure in the combustion chamber can also be calculated via the sensor signal of the knocking sensor, as a result of which a cylinder pressure sensor can even be dispensed with entirely in order to carry out a control or regulation of the internal combustion engine.

However, a disadvantage of this has proved to be that a corresponding determination of the cylinder pressure via the knocking signal is not only individual to the subassembly but even individual to each internal combustion engine itself, as a result of which a certain adaptation of a model (e.g., computer model) is to be carried out in order to arrive at a cylinder pressure via the knocking signal.

However, it has furthermore proved to be the case that the calculation of the cylinder pressure via the knocking signal also changes with the operating condition (for example, a variation in the fuel quality) and/or an aging of the internal combustion engine, as a result of which only with very high adaptation effort and corresponding calibration work is it possible to be able to continuously provide a reliable statement about the cylinder pressure via the knocking signal during the ongoing operation of the internal combustion engine.

BRIEF DESCRIPTION

An aspect of the present invention, in certain embodiments, is to provide a method for operating an internal combustion engine, as well as an internal combustion engine, in which the previously mentioned problems of the state of the art can be at least partially improved and/or a reliable and meaningful possibility is created to give information about the prevailing cylinder pressure in an internal combustion engine during ongoing operation and/or to implement an economic and ecological variant for determining a cylinder pressure yet with the necessary accuracy.

This aspect is achieved according to certain embodiments of the invention by a method for operating an internal combustion engine with the features of the claims, an internal combustion engine-preferably a piston engine—with the features of the claims, a computer program product with the features of the claims, as well as a computer-readable storage medium.

According to a first aspect of the invention, it is provided that a method for operating an internal combustion engine—in particular a piston engine-comprises the following steps:

- collecting a knocking signal of a knocking sensor,
- collecting a cylinder pressure signal of a cylinder pressure sensor, which cylinder pressure signal is representative of a cylinder pressure prevailing in the at least one combustion chamber of the internal combustion engine,
- determining a cylinder pressure estimated on the basis of a model from the knocking signal,
- subjecting the cylinder pressure signal to a plausibility check and,
- if the cylinder pressure signal is not plausible according to the plausibility check, using the estimated cylinder pressure for the operation of the internal combustion engine.

According to this aspect of the present invention, it is possible to use a cylinder pressure sensor which provides a more accurate representative signal for the cylinder pressure prevailing in the combustion chamber, wherein sensor models which are not quite high quality can also be used since, in a sense, a failsafe is provided via the knocking sensor and the knocking signal.

Thus, the plausibility of the cylinder pressure signal of the cylinder pressure sensor is checked continuously through the plausibility check and, when the cylinder pressure signal of the cylinder pressure sensor is no longer plausible, the estimated cylinder pressure—as it were as failure protection for the cylinder pressure—is used in order to be able to guarantee the further operation of the internal combustion engine.

In this way, an internal combustion engine can continue to be operated even when a cylinder pressure sensor fails, which significantly increases the economic operation of the internal combustion engine.

Furthermore, it is possible to supply the internal combustion engine with cylinder pressure signals of the cylinder pressure sensor that are as accurate as possible for as long as possible in order to be able to facilitate an optimum operation of the internal combustion engine, which not only can reduce the emissions but can also increase the efficiency for an operation that is as ecological as possible.

As part of a further aspect of the invention, it can be provided that in a method for operating an internal combustion engine—in particular a piston engine—the following steps are executed:

- collecting a knocking signal of a knocking sensor,
- collecting a cylinder pressure signal of a cylinder pressure sensor, which cylinder pressure signal is representative of a cylinder pressure prevailing in the at least one combustion chamber of the internal combustion engine,
- determining an estimated cylinder pressure on the basis of a model from the knocking signal, and
- adapting the model on the basis of the cylinder pressure signal, with the result that the estimated cylinder pressure comes closer to the cylinder pressure signal and/or the cylinder pressure prevailing in the at least one combustion chamber.

In this way, as part of a further aspect of the invention, the model, which describes a relationship between the knocking signal and the prevailing cylinder pressure in the combustion chamber, can be adapted continuously during the ongoing operation, with the result that an aging or other changes in operating parameters have no effect on the accuracy of the estimated cylinder pressure with respect to the actual cylinder pressure prevailing in the combustion chamber.

In a particularly favourable manner, it can be provided that the two aspects of the present invention are combined with one another, wherein the model, which describes the relationship between knocking signal and estimated cylinder pressure, is adapted continuously during the ongoing operation and, when a cylinder pressure signal measured by the cylinder pressure sensor no longer appears to be plausible, the further operation of the internal combustion engine can be continued by taking into account the estimated cylinder pressure.

In other words, within the framework of certain embodiments of the invention, preferably through the measure, which is actually counterintuitive, of using a cylinder pressure sensor and a knocking sensor, the advantage can also be exploited that the knocking signals can be calibrated for a very long time and very precisely such that a high-quality cylinder pressure signal is available via the knocking sensor even after a failure of the cylinder pressure sensor.

By internal combustion engines can be meant thermal work machines in which energy being thermally released by combustion is converted into mechanical work, such as for example in the case of petrol engines, diesel engines, gas turbines, boilers or the like.

The use of certain embodiments of the invention in stationary internal combustion engines—preferably gas-powered piston engines—has proved to be particularly favourable. Marine applications are also entirely conceivable.

Internal combustion engines, in particular stationary internal combustion engines, can be used to drive generators for producing electricity. Such units with a generator driven by an internal combustion engine are often also called gensets.

An internal combustion engine according to certain embodiments of the invention or a method according to certain embodiments of the invention can be used and installed subsequently in already existing systems of the state of the art, as described in the introduction to the description for example.

Advantageous embodiments of the invention are defined in the dependent claims.

It can be provided that—preferably if the cylinder pressure signal is plausible according to the plausibility check—the model is adapted on the basis of the cylinder pressure signal such that the estimated cylinder pressure comes closer to the cylinder pressure signal and/or the cylinder pressure prevailing in the at least one combustion chamber.

It can preferably be provided that—if the cylinder pressure signal is plausible according to the plausibility check—the cylinder pressure signal of the cylinder pressure sensor is used for the operation of the internal combustion engine.

It can be provided that the method is carried out in a time-resolved and/or crank-angle-resolved manner—preferably in real time—during the operation of the internal combustion engine.

Embodiment variants in which the method is carried out based on the engine cycle or at a particular point in time of the cycle (wherein the method is carried out when the data are present, for example) are also entirely conceivable.

It can preferably be provided that the estimated cylinder pressure and/or the cylinder pressure signal of the cylinder pressure sensor is used for a control or regulation of the internal combustion engine-particularly preferably to come closer to a desired drive power, energy requirement or emission of the internal combustion engine.

It can be provided that the plausibility of the cylinder pressure signal is determined with the aid of at least one further determined operating parameter of the internal combustion engine.

Such a further determined operating parameter can be at least one of the following operating parameters:

- an ignition time point,
- a drive power and/or a torque,
- an angular velocity and/or a mains frequency of a generator driven by the internal combustion engine or a grid connected thereto,
- a boost pressure,
- a charge air temperature, and/or
- a combustion temperature.

It can be provided that the further determined operating parameter is provided as a measured sensor signal by at least one sensor and/or by a machine control unit of the internal combustion engine.

It can preferably be provided that the cylinder pressure signal is plausible according to a plausibility check when the cylinder pressure signal complies with a predefined relationship between a cylinder pressure signal and the further determined operating parameters, wherein the relationship particularly preferably defines a value range for the cylinder pressure signal.

The value range can correspond to a defined cylinder pressure signal for a particular operating parameter+/−a tolerance range.

This tolerance range can preferably tolerate a measuring inaccuracy, combustion inertness or other value deviations to be assumed and expected which relate to an acceptable variation.

It can also be provided that the plausibility of the cylinder pressure signal is determined without the aid of a further operating parameter of the internal combustion engine.

For example, the plausibility of the cylinder pressure signal can be ascertained by comparison with a predefined maximum, minimum and/or a value range.

It can be provided that the comparison of the determined cylinder pressure signal takes place with a predefined tractrix curve, which is preferably also calculated in any case during the combustion, wherein the cylinder pressure signal no longer appears to be plausible when it deviates too far from the tractrix curve.

A general plausibility check is also entirely conceivable, wherein, for example, negative values or unexpected values in particular areas of the cycle of the combustion are assessed as not plausible.

It can be provided that, for the operation of the internal combustion engine, the cylinder pressure signal and/or the estimated cylinder pressure is used for controlling or regulating a control variable of the combustion engine, preferably an ignition time point, a boost pressure, a supplied quantity of fuel, a supplied quantity of charge air and/or an exhaust gas recirculation rate.

Furthermore, protection is sought for an internal combustion engine, preferably a piston engine, comprising:
- at least one combustion chamber,
- a cylinder pressure sensor arranged on the at least one combustion chamber which is formed to determine a cylinder pressure signal that is representative of a cylinder pressure prevailing in the at least one combustion chamber of the internal combustion engine,
- at least one knocking sensor, which is formed to determine a representative knocking signal of the internal combustion engine, preferably of the at least one combustion chamber, and
- at least one controlling or regulating device, which is formed to receive a cylinder pressure signal of the cylinder pressure sensor and the knocking signal of the knocking sensor,
- wherein the controlling or regulating device is furthermore formed to execute a method according to certain embodiments of the invention.

Protection is also sought for a computer program product, comprising commands which prompt an executing computer, in particular a controlling or regulating device of an internal combustion engine:
- to receive a knocking signal of a knocking sensor,
- to receive a cylinder pressure signal of a cylinder pressure sensor that is representative of a cylinder pressure prevailing in the at least one combustion chamber of the internal combustion engine,
- on the basis of a model, to determine an estimated cylinder pressure from a knocking signal,
- to subject the cylinder pressure signal to a plausibility check and,
- if the cylinder pressure signal is not plausible according to the plausibility check, to use or output the estimated cylinder pressure for the operation of the internal combustion engine.

Protection is furthermore sought for a computer-readable storage medium on which a computer program product according to certain embodiments of the invention is stored.

BRIEF DESCRIPTION OF THE DRAWINGS

Further details and advantages of the present invention are explained in more detail below with the aid of the description of the FIGURES with reference to the FIGURE.

FIG. 1 shows a schematic flow diagram of a method according to the invention for operating an internal combustion engine.

DETAILED DESCRIPTION

In the example embodiment as illustrated in FIG. 1, the internal combustion engine comprises a knocking sensor 2, by which a knocking signal 1 (e.g., knocking sensor signal) can be collected, and a cylinder pressure sensor 4, by which a cylinder pressure signal 3 can be collected.

The cylinder pressure signal 3 of the cylinder pressure sensor 4 is representative of a cylinder pressure prevailing in at least one combustion chamber of the internal combustion engine.

The knocking sensor 1 can be arranged on the internal combustion engine correspondingly associated with the same combustion chamber as the cylinder pressure sensor 4 (for example, on a cylinder head of the respective combustion chamber) or globally collect a knocking signal 1 for the whole internal combustion engine.

In a first step, the knocking signal 1 of the knocking sensor 2 is supplied to a signal filter 10, which correspondingly filters the knocking signal 1 of the knocking sensor 2 and pre-processes it for the further processing, wherein disturbance variables are filtered out and the knocking signal 1 is correspondingly cleaned up, and if necessary the knocking signal 1 is converted to a preferred signal magnitude.

Then, the pre-processed knocking signal 1 is passed on to a model 5 (e.g., computer model), which model 5 reflects a relationship between the pre-processed knocking signal 1 and an estimated cylinder pressure 6, as a result of which the filtered knocking signal 1 is converted into an estimated cylinder pressure 6.

Here, the model 5 can take into account yet further operating parameters 9 of the internal combustion engine, wherein, for example, the knocking signal 1 is further processed in a crank-angle-resolved manner into an estimated cylinder pressure 6.

By way of example, further operating parameters 9 of the internal combustion engine can be a crank angle ω, a boost pressure $P_2'$, a charge air temperature $T_2'$ or an ignition time point ITP.

After the measurement by the cylinder pressure sensor 4, the cylinder pressure signal 3 is routed to a plausibility check 7, wherein the cylinder pressure signal 3 is subjected to a plausibility check 7 with the aid of further operating parameters 9.

In this embodiment example, the plausibility check 7 comprises a query, wherein a defined value range with respect to the further operating parameters 9 is represented, wherein-when the cylinder pressure signal 3 corresponds to this defined value range—the cylinder pressure signal 3 is classified as plausible and the switch is adjusted by the plausibility check 7 such that the cylinder pressure signal 3 is passed on to the controlling or regulating device 8 (e.g., controller) of the internal combustion engine.

If the cylinder pressure signal 3 is not classified as plausible by the plausibility check 7, the switch is repositioned and, instead of the cylinder pressure signal 3, the estimated cylinder pressure 6 is relayed to the controlling or regulating device 8 of the internal combustion engine, wherein the further control or regulation of the internal combustion engine is effected on the basis of the estimated cylinder pressure 6 instead of the cylinder pressure signal 3.

Through the plausibility check 7, for example, a defect in the cylinder pressure sensor 4 can thus be identified and avoided in good time, with the result that incorrect cylinder pressure signals 3, which could possibly result in an incorrect control or regulation of the internal combustion engine being carried out, are not used for the control or regulation by the controlling or regulating device 8 of the internal combustion engine.

However, when the plausibility check 7 reveals that the cylinder pressure signal 3 appears to be plausible, the model adaptation 11 is furthermore activated by the plausibility check 7.

A difference between estimated cylinder pressure 6 and cylinder pressure signal 3 is supplied to this model adaptation 11 and, on the basis of this difference, the model 5 is adapted by the model adaptation 11, such that the estimated cylinder pressure 6 is brought closer to the cylinder pressure signal 3.

Through a corresponding, continuous adaptation of the model 5—as long as the cylinder pressure signal 3 appears to be plausible—a change in the operating conditions, wear and/or aging of the internal combustion engine can be entered into the model 5 and it can be ensured that a precisely fitting relationship between knocking signal 1 and cylinder pressure continues to be provided by the model 5.

After either the cylinder pressure signal 3 or the estimated cylinder pressure 6 is passed on to the controlling or regulating device 8 of the internal combustion engine by the plausibility check 7, a further plausibility query 12 is carried out, which carries out an additional plausibility check taking into account further operating parameters 9 of the internal combustion engine in order to ensure that the cylinder pressure signal 3 supplied to the controlling or regulating device 8 or the estimated cylinder pressure 6 also corresponds to a true actual value of the pressure in the combustion chamber.

The controlling or regulating device 8 of the internal combustion engine can then perform a corresponding control or regulation of the internal combustion engine on the basis of the characteristic signal for the pressure in the combustion chamber via output of the control variables 13, wherein, for example, a mass of fuel mG, an ignition time point ITP, an ignition failure or other changes in control variables of the internal combustion engine can be performed.

The method represented in FIG. 1 is meant purely by way of example, wherein it is to be noted that these method steps can be integrated into the controlling or regulating device 8 of the internal combustion engine for example through corresponding software components.

This controlling or regulating device 8 of the internal combustion engine can be implemented, for example, as a central machine control unit (e.g., controller) of the internal combustion engine.

Furthermore, it is to be mentioned that the method represented in FIG. 1 can be performed individually for each combustion chamber of the internal combustion engine or also globally across the whole internal combustion engine.

LIST OF REFERENCE NUMBERS

1 knocking signal
2 knocking sensor
3 cylinder pressure signal
4 cylinder pressure sensor
5 model
6 estimated cylinder pressure
7 plausibility check
8 controlling or regulating device
9 further operating parameter
10 signal filter
11 model adaptation
12 further plausibility query
13 control variable

The invention claimed is:

1. A method for operating an internal combustion engine, comprising:
- collecting a knocking signal of a knocking sensor;
- collecting a cylinder pressure signal of a cylinder pressure sensor measuring a cylinder pressure prevailing in a combustion chamber of the internal combustion engine;
- determining an estimated cylinder pressure in the combustion chamber on the basis of a model and the knocking signal;
- subjecting the cylinder pressure signal to a plausibility check to classify the cylinder pressure signal as either plausible or non-plausible; and
- controlling at least one control variable of the internal combustion engine based on a target operational parameter and at least partially based on the plausibility check, wherein controlling comprises:
  - controlling the internal combustion engine using the cylinder pressure signal in response to the plausibility check classifying the cylinder pressure signal as plausible; and
  - controlling the internal combustion engine using the estimated cylinder pressure in response to the plausibility check classifying the cylinder pressure signal as non-plausible, further comprising at least one of:
  - the target operational parameter comprises a desired drive power, an energy requirement, an emission, or any combination thereof; or
  - the least one control variable comprises an ignition time point, a boost pressure, a supplied quantity of fuel, a supplied quantity of charge air, an exhaust gas recirculation rate, or any combination thereof.

2. The method of claim 1, wherein, in response to the plausibility check classifying the cylinder pressure signal as plausible, adapting the model on the basis of the cylinder pressure signal, operating conditions, wear, and aging of the internal combustion engine, such that the estimated cylinder pressure comes closer to the cylinder pressure signal and/or the cylinder pressure prevailing in the combustion chamber.

3. The method of claim 1, wherein the plausibility check comprises a plurality of plausibility checks to classify the cylinder pressure signal as either plausible or non-plausible for each cycle of the internal combustion engine, and at least one of the plurality of plausibility checks indicates a defect or failure of the cylinder pressure sensor.

4. The method of claim 1, wherein collecting the knocking signal, collecting the cylinder pressure signal, determining the estimated cylinder pressure, and subjecting the cylinder pressure signal to the plausibility check is carried out, in real time, in a time-resolved manner at a time during each cycle of a plurality of cycles of the internal combustion engine and/or a crank-angle-resolved manner at a crank angle during each cycle of the plurality of cycles of the internal combustion engine.

5. The method of claim 1, wherein controlling comprises controlling the at least one control variable of the internal combustion engine using the estimated cylinder pressure and/or the cylinder pressure signal of the cylinder pressure sensor, to come closer to the target operational parameter comprising the desired drive power, the energy requirement, the emission of the internal combustion engine, or any combination thereof.

6. The method of claim 1, comprising determining the plausibility of the cylinder pressure signal with the aid of at least one further determined operating parameter of the internal combustion engine.

7. The method of claim 6, wherein at least one of the following operating parameters is used as the at least one further determined operating parameter:

an ignition time point;

a drive power and/or a torque;

an angular velocity and/or a mains frequency;

a boost pressure;

a charge air temperature; and/or a combustion temperature.

8. The method of claim 6, wherein the at least one further determined operating parameter is provided as a measured sensor signal by at least one sensor and/or by a controller of the internal combustion engine.

9. The method of claim 6, wherein the cylinder pressure signal is plausible according to the plausibility check when the cylinder pressure signal complies with a predefined relationship between the cylinder pressure signal and the at least one further determined operating parameter, wherein the predefined relationship defines a value range for the cylinder pressure signal, wherein the plausibility check indicates the cylinder pressure signal is plausible in response to the cylinder pressure signal being within the value range based on the at least one further determined operating parameter, wherein the plausibility check indicates the cylinder pressure signal is not plausible in response to the cylinder pressure signal being outside of the value range based on the at least one further determined operating parameter.

10. The method of claim 1, wherein the at least one control variable comprises the ignition time point, the boost pressure, the supplied quantity of fuel, the supplied quantity of charge air, the exhaust gas recirculation rate, or any combination thereof.

11. The method of claim 1, comprising, for each cycle of the internal combustion engine:

collecting the cylinder pressure signal from each of a plurality of cylinder pressure sensors measuring the cylinder pressure prevailing in each of a plurality of piston-cylinder assemblies, wherein each of the plurality of piston-cylinder assemblies comprises one of a plurality of combustion chambers and one of the plurality of cylinder pressure sensors;

determining the estimated cylinder pressure in the combustion chamber of each of the plurality of piston-cylinder assemblies on the basis of the model and the knocking signal;

subjecting the cylinder pressure signal of each of the plurality of piston-cylinder assemblies to the plausibility check to classify the cylinder pressure signal as either plausible or non-plausible as a defect or failure of the cylinder pressure sensor;

adapting the model on the basis of the cylinder pressure signal, operating conditions, wear, and aging of the internal combustion engine, such that the estimated cylinder pressure comes closer to the cylinder pressure signal and/or the cylinder pressure prevailing in the at least one combustion chamber for each of the plurality of piston-cylinder assemblies; and controlling the at least one control variable of the internal combustion engine based on the target operational parameter and at least partially based on the plausibility check for each of the plurality of piston-cylinder assemblies, wherein controlling comprises, for each of the plurality of piston-cylinder assemblies:

controlling the internal combustion engine using the cylinder pressure signal in response to the plausibility check classifying the cylinder pressure signal as plausible; and controlling the internal combustion engine using the estimated cylinder pressure in response to the plausibility check classifying the cylinder pressure signal as non-plausible.

12. An internal combustion engine, comprising:

a plurality of combustion chambers;

a plurality of cylinder pressure sensors each arranged on one of the plurality of combustion chambers;

one or more knocking sensors; and a controller configured to receive cylinder pressure signals of the plurality of cylinder pressure sensors obtaining pressure measurements in the respective plurality of combustion chambers and knocking signals of the one or more knocking sensors, wherein the controller is configured to execute the method of claim 1 for each combustion chamber of the plurality of combustion chambers for each cycle of the internal combustion engine.

13. A computer program product, comprising commands stored on a computer-readable storage medium and executable by a controller, to perform the method of claim 1.

14. A system, comprising:

a controller, configured to:

collect a knocking signal of a knocking sensor;

collect a cylinder pressure signal of a cylinder pressure sensor measuring a cylinder pressure prevailing in a combustion chamber of the internal combustion engine;

determine an estimated cylinder pressure in the combustion chamber on the basis of a model and the knocking signal;

subject the cylinder pressure signal to a plausibility check to classify the cylinder pressure signal as either plausible or non-plausible; and control the at least one control variable of the internal combustion engine based on a target operational parameter and at least partially based on the plausibility check, wherein the control comprises operations to:

control the internal combustion engine using the cylinder pressure signal in response to the plausibility check classifying the cylinder pressure signal as plausible; and control the internal combustion engine using the estimated cylinder pressure in response to the plausibility check classifying the cylinder pressure signal as non-plausible, further comprising at least one of:

the target operational parameter comprises a desired drive power, an energy requirement, an emission, or any combination thereof; or the least one control variable comprises an ignition time point, a boost pressure, a supplied quantity of fuel, a supplied quantity of charge air, an exhaust gas recirculation rate, or any combination thereof.

15. The system of claim 14, comprising the internal combustion engine having the controller.

16. The system of claim 14, wherein the controller is configured to adapt the model on the basis of the cylinder pressure signal, operating conditions, wear, and aging of the internal combustion engine, such that the estimated cylinder pressure comes closer to the cylinder pressure signal and/or the cylinder pressure prevailing in the combustion chamber.

17. The system of claim 16, wherein the controller is configured to, for each cycle of the internal combustion engine:

collect the cylinder pressure signal from each of a plurality of cylinder pressure sensors measuring the cylinder pressure prevailing in each of a plurality of piston-cylinder assemblies, wherein each of the plurality of piston-cylinder assemblies comprises one of a plurality of combustion chambers and one of the plurality of cylinder pressure sensors;

determine the estimated cylinder pressure in the combustion chamber of each of the plurality of piston-cylinder assemblies on the basis of the model and the knocking signal;

subject the cylinder pressure signal of each of the plurality of piston-cylinder assemblies to the plausibility check to classify the cylinder pressure signal as either plausible or non-plausible as a defect or failure of the cylinder pressure sensor;

adapt the model on the basis of the cylinder pressure signal, operating conditions, wear, and aging of the internal combustion engine, such that the estimated cylinder pressure comes closer to the cylinder pressure signal and/or the cylinder pressure prevailing in the combustion chamber for each of the plurality of piston-cylinder assemblies; and control the at least one control variable of the internal combustion engine based on the target operational parameter and at least partially based on the plausibility check for each of the plurality of piston-cylinder assemblies, wherein the control comprises, for each of the plurality of piston-cylinder assemblies, operations to:

control the internal combustion engine using the cylinder pressure signal in response to the plausibility check classifying the cylinder pressure signal as plausible; and control the internal combustion engine using the estimated cylinder pressure in response to the plausibility check classifying the cylinder pressure signal as non-plausible.

18. The system of claim 17, wherein, for each of the plurality of piston-cylinder assemblies, the controller is configured to adapt the model based on the cylinder pressure signal in response to the plausibility check classifying the cylinder pressure signal as plausible, and the controller is configured to not adapt the model based on the cylinder pressure signal in response to the plausibility check classifying the cylinder pressure signal as non-plausible.

19. A system, comprising:

a combustion chamber of an internal combustion engine;

a knocking sensor configured to collect a knocking signal;

a cylinder pressure sensor configured to collect a cylinder pressure signal measuring a cylinder pressure prevailing in the combustion chamber of the internal combustion engine;

a controller configured to:

determine an estimated cylinder pressure in the combustion chamber on the basis of a model and the knocking signal;

subject the cylinder pressure signal to a plausibility check to classify the cylinder pressure signal as either plausible or non-plausible; and control at least one control variable of the internal combustion engine based on a target operational parameter and at least partially based on the plausibility check, wherein the control comprises operations to:

control the internal combustion engine using the cylinder pressure signal in response to the plausibility check classifying the cylinder pressure signal as plausible; and control the internal combustion engine using the estimated cylinder pressure in response to the plausibility check classifying the cylinder pressure signal as non-plausible, further comprising at least one of:

the target operational parameter comprises a desired drive power, an energy requirement, an emission, or any combination thereof; or the least one control variable comprises an ignition time point, a boost pressure, a supplied quantity of fuel, a supplied quantity of charge air, an exhaust gas recirculation rate, or any combination thereof.

20. The system of claim 19, comprising the internal combustion engine having a plurality of piston-cylinder assemblies each having one of a plurality of combustion chambers and one of a plurality of cylinder pressure sensors, wherein the controller is configured to, for each cycle of the internal combustion engine:

collect the cylinder pressure signal of the cylinder pressure sensor of each of the plurality of piston-cylinder assemblies;

determine the estimated cylinder pressure in the combustion chamber of each of the plurality of piston-cylinder assemblies on the basis of the model and the knocking signal;

subject the cylinder pressure signal of each of the plurality of piston-cylinder assemblies to a plurality of plausibility checks to classify the cylinder pressure signal as either plausible or non-plausible;

adapt the model on the basis of the cylinder pressure signal, operating conditions, wear, and aging of the internal combustion engine, such that the estimated cylinder pressure comes closer to the cylinder pressure signal and/or the cylinder pressure prevailing in the combustion chamber for each of the plurality of piston-cylinder assemblies; and control the at least one control variable of the internal combustion engine based on the target operational parameter and at least partially based on the plausibility check for each of the plurality of piston-cylinder assemblies, wherein the control comprises, for each of the plurality of piston-cylinder assemblies, operations to:

control the internal combustion engine using the cylinder pressure signal in response to the plausibility check classifying the cylinder pressure signal as plausible; and control the internal combustion engine using the estimated cylinder pressure in response to the plausibility check classifying the cylinder pressure signal as non-plausible.

* * * * *